United States Patent [19]

Overcash et al.

[11] Patent Number: 5,603,996
[45] Date of Patent: Feb. 18, 1997

[54] COATED SHEET MATERIAL AND METHOD

[75] Inventors: Derric Overcash; Ronald L. Elsenbaumer, both of Arlington, Tex.

[73] Assignee: **A*ware Technologies, L.C.**, Dallas, Tex.

[21] Appl. No.: 119,143

[22] PCT Filed: Jan. 22, 1993

[86] PCT No.: PCT/US93/01161
§ 371 Date: Sep. 20, 1993
§ 102(e) Date: Sep. 20, 1993

Related U.S. Application Data

[63] Continuation-in-part of Ser. No. 823,877, Jan. 22, 1992, abandoned.

[51] Int. Cl.$^6$ ............... B65D 5/56; B65D 5/62; B32B 29/06
[52] U.S. Cl. ............... 428/34.2; 428/36.7; 428/182; 428/219; 428/342; 428/420; 428/482; 428/483; 428/507; 428/510; 428/513; 427/333; 427/407.1; 229/3.1; 229/3.5 R
[58] Field of Search ............... 428/537.7, 34.2, 428/481, 482, 483, 510, 513, 537.5, 40, 34.3, 507, 508, 511, 182, 420, 219, 36.6, 36.7, 340–342; 427/471, 209, 333, 407.1; 229/3.1, 3.5 R; 156/244.11

[56] References Cited

U.S. PATENT DOCUMENTS

| Re. 32,270 | 10/1986 | Murray, Jr. | 428/335 |
|---|---|---|---|
| 2,899,922 | 8/1959 | Wheeler | 72/336 |
| 3,099,377 | 7/1963 | Metzler et al. | 229/2.5 R |
| 3,229,886 | 1/1966 | Grogel | 229/2.5 R |
| 3,238,078 | 3/1966 | Baldwin | 156/57 |

(List continued on next page.)

FOREIGN PATENT DOCUMENTS

| 0237235 | 9/1987 | European Pat. Off. . |
|---|---|---|
| 0245005 | 11/1987 | European Pat. Off. . |
| 0341937 | 11/1989 | European Pat. Off. . |
| 3835796 | 10/1987 | Germany . |
| WO8202184 | 7/1982 | WIPO . |

OTHER PUBLICATIONS

Abstract of Gibbons et al., U.S.S.N. 864,142.
"Quilon® Chrome Complexes for Improved Performance of Polyvinyl Alcohol Paper Coatings, Films, and Adhesives," DuPont.
"Quilon Chrome Complexes," DuPont Chemicals, Apr. 1992.
"Rhoplex P–376," Rohm and Haas Company, 1991.
"Rhoplex B–15," Rohm and Haas Company.
"Rhoplex B–60A," Rohm and Haas Company, Jun., 1972.

*Primary Examiner*—Henry F. Epstein
*Assistant Examiner*—Rena L. Dye
*Attorney, Agent, or Firm*—Baker & Botts, L.L.P.

[57] ABSTRACT

A novel coated sheet material is made by: (a) coating a porous substrate sheet material with a barrier coating comprised of (i) a cross-linkable polymer resistant to penetration by water moister when cured, and (ii) a water-dispersible, film-forming polymer that is resistant to penetration by grease and oil when cured, said barrier coating composition forming a barrier layer on said substrate sheet material; and (b) coating said barrier layer with a release coating composition. The coated sheet material may be used to make containers, wrappers and/or receptacles for food and other substances, including ovenable and dual-ovenable embodiments thereof.

52 Claims, 2 Drawing Sheets

U.S. PATENT DOCUMENTS

| | | | |
|---|---|---|---|
| 3,493,106 | 2/1970 | Galli | 206/497 |
| 3,496,896 | 2/1970 | Smith | 72/348 |
| 3,819,773 | 6/1974 | Pears | 264/37 |
| 3,924,013 | 12/1975 | Kane | 426/523 |
| 3,994,212 | 11/1976 | Wong | 99/444 |
| 4,026,458 | 5/1977 | Morris et al. | 229/30 |
| 4,085,244 | 4/1978 | Stillman | 383/116 |
| 4,134,004 | 1/1979 | Anderson et al. | 219/387 |
| 4,147,836 | 4/1979 | Middleton et al. | 428/481 |
| 4,154,899 | 5/1979 | Hershey et al. | 428/537.5 |
| 4,173,823 | 11/1979 | Anderson et al. | 29/611 |
| 4,214,035 | 7/1980 | Heberger | 428/340 |
| 4,216,268 | 8/1980 | Stillman | 428/424.8 |
| 4,260,060 | 4/1981 | Faller | 229/104 |
| 4,277,506 | 7/1981 | Austin | 426/111 |
| 4,279,933 | 7/1981 | Austin et al. | 426/124 |
| 4,287,274 | 9/1981 | Ibbotson et al. | 429/156 |
| 4,309,466 | 1/1982 | Stillman | 428/35.3 |
| 4,337,116 | 6/1982 | Foster et al. | 162/158 |
| 4,343,858 | 8/1982 | Thompson | 428/342 |
| 4,365,739 | 12/1982 | Webinger | 229/125.02 |
| 4,371,110 | 2/1983 | Kulig | 229/122 |
| 4,387,126 | 6/1983 | Rebholz | 428/34.3 |
| 4,418,119 | 11/1983 | Morrow et al. | 428/342 |
| 4,442,252 | 4/1984 | Sumi et al. | 524/183 |
| 4,456,164 | 6/1984 | Foster et al. | 229/125.35 |
| 4,469,258 | 9/1984 | Wright et al. | 229/123.1 |
| 4,486,483 | 12/1984 | Caines | 428/195 |
| 4,510,019 | 4/1985 | Bartelloni | 162/141 |
| 4,518,651 | 5/1985 | Wolfe, Jr. | 428/308.8 |
| 4,529,464 | 7/1985 | Jones | 156/244.24 |
| 4,543,280 | 9/1985 | Fujita et al. | 206/524.3 |
| 4,590,349 | 5/1986 | Brown et al. | 219/10.55 E |
| 4,641,005 | 2/1987 | Seiferth | 219/10.55 E |
| 4,673,698 | 6/1987 | Krankkala | 524/47 |
| 4,698,246 | 10/1987 | Gibbons et al. | 428/34.2 |
| 4,699,845 | 10/1987 | Oikawa et al. | 428/480 |
| 4,713,510 | 12/1987 | Quick et al. | 219/10.55 E |
| 4,735,513 | 4/1988 | Watkins et al. | 383/116 |
| 4,784,708 | 11/1988 | Allen | 156/67 |
| 4,813,594 | 3/1989 | Brown et al. | 229/103 |
| 4,826,719 | 5/1989 | Murdock et al. | 428/182 |
| 4,895,747 | 1/1990 | Birkholz et al. | 428/40 |
| 4,900,594 | 2/1990 | Quick et al. | 428/34.2 |
| 4,929,476 | 5/1990 | Gibbons et al. | 428/34.2 |
| 4,930,681 | 6/1990 | Fultz et al. | 229/114 |
| 4,935,282 | 6/1990 | Pawlowski et al. | 428/121 |
| 4,940,612 | 7/1990 | Gibbons et al. | 428/34.2 |
| 4,990,378 | 2/1991 | Jones | 427/420 |
| 5,002,833 | 3/1991 | Kinsey, Jr. et al. | 428/475.8 |
| 5,029,714 | 7/1991 | Cassidy | 229/209 |

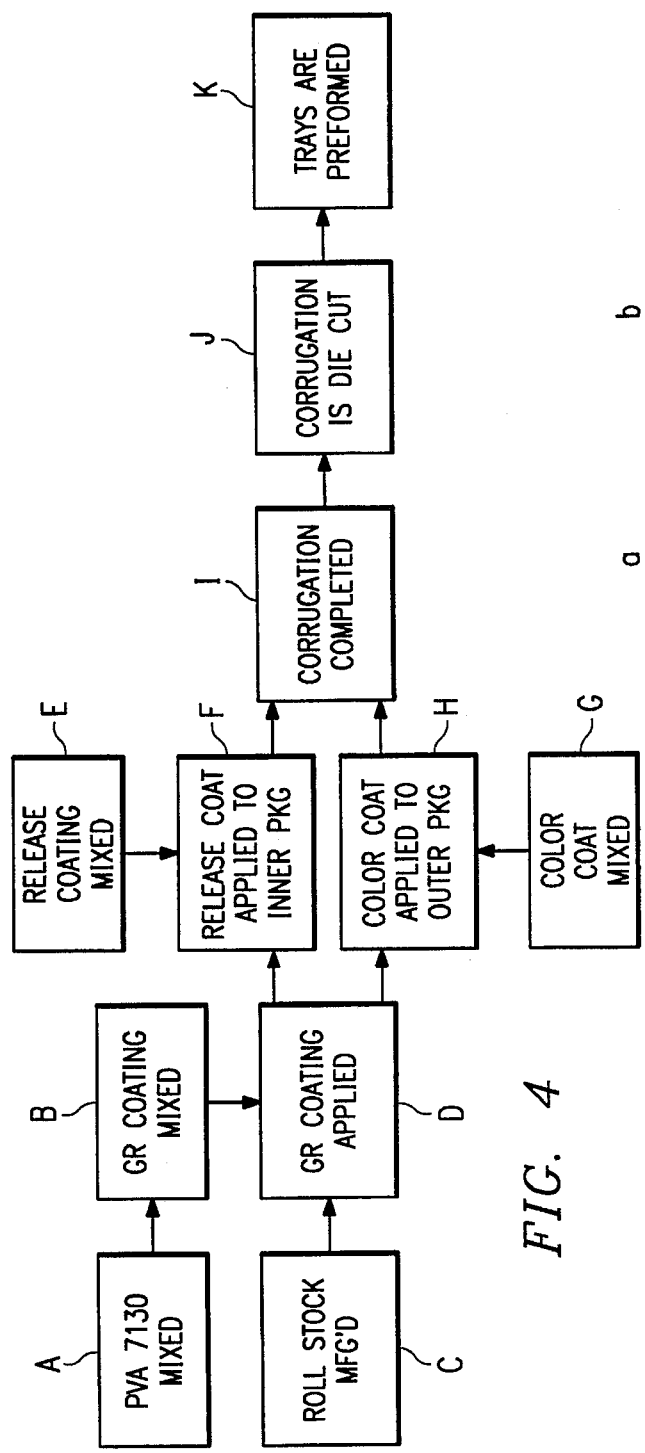
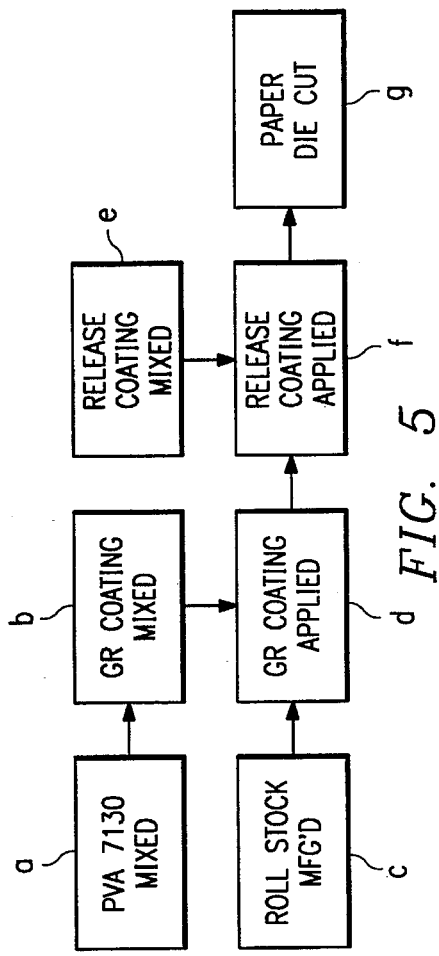
FIG. 4
FIG. 5

COATED SHEET MATERIAL AND METHOD

CROSS REFERENCE

This application is a continuation-in-part of U.S. Ser. No. 07/823,877, filed Jan. 22, 1992 which is now abandoned.

FIELD OF THE INVENTION

This invention relates generally to coated sheet materials for use in making containers, wrappers and receptacles for food and other materials, including containers that are ovenable. This invention also relates to containers, food wrappers, receptacles and the like formed from such coated sheet materials. The invention also relates to methods for making same.

BACKGROUND OF THE INVENTION

One of the most common types of containers used for heating food in an oven is the aluminum pan, or other such containers made of a thin sheet of aluminum or aluminum foil. Such aluminum containers may be preformed into a specific shape, thus avoiding the labor required for assembly of the shaped article, and can be easily stacked, thus allowing for easy storage and dispensing therefrom for use. Furthermore, such aluminum containers are resistant to penetration by grease or oil, or by water moisture, and permit good browning of baked goods that are baked therein. An example of these sorts of aluminum containers is disclosed in U.S. Pat. No. 3,496,896 to Smith.

Though strong and readily preformable, aluminum containers generally cannot be used in microwave cooking. Consequently, efforts have been made to develop plastic containers and plastic-coated paper structures that can withstand heating in either conventional or microwave ovens—i.e., that are "dual-ovenable." To be "ovenable" for purposes of a conventional oven, a structure should be able to withstand temperatures of up to at least 300° F. and, preferably, about 400° F. or so; to be "ovenable" for purposes of a microwave oven, the structure should be strong at boiling water temperatures and should not reflect microwaves and thereby cause arcing or damage the oven's microwave generation. Furthermore, concurrent with such efforts directed at developing dual-ovenable containers, there has been interest in achieving this result without increasing the cost of the container, or preferably by decreasing such costs.

One development in this area has been the use of extruded films of polyethylene terephthalate (PET), or polybutylene terephthalate (PBT), adhered to a paper material for oven-bearable trays. For example, U.S. Pat. No. 4,900,594 to Quick et al. discloses an ovenable tray made with a biaxially oriented film of PET, such as MYLAR™. The PET film is adhered to a paperboard substrate by means of a cross-linkable adhesive. A shaped tray is formed from the PET-paperboard laminate by pressure-forming procedures such as that described in U.S. Pat. No. 4,026,458 to Morris et al. However, such PET-paperboard laminates are generally not biodegradable, or not readily so, and are not readily gluable to form trays simply by folding the corners in appropriate configurations and applying an appropriate glue or adhesive. Rather, as noted above, ovenable trays are formed from the PET-paperboard laminate generally by pressure-forming the laminate into the desired shape.

Another approach has been to form a laminate by extruding layers of polymethylpentene, tie resins, and barrier resins onto a paper substrate, as is disclosed in U.S. Pat. No. 5,002,833 to Kinsey, Jr. et al. The resulting product is said to have a high degree of adhesion between the paper substrate and the polymethylpentene food contact layer, and is said to be capable of being utilized for forming pressed or locked corner food trays which can be subjected to oven cooking temperatures. The laminate may be made by co-extruding, directly onto a paper substrate, a three-layer sandwich comprised of a barrier resin (such as polyamide resins, copolyamide resins such as nylon resins, polyester resins, or copolyester resins), a tie resin (such as chemically modified graft copolymers of methylpentene), and a release layer of polymethylpentene (the food contacting layer). The structure so made makes up a three layer coextrusion on a paper substrate. From a manufacturing standpoint, however, the extrusion or coextrusion process is more difficult and costly than a simple coating process and requires appropriate extruding equipment.

Yet another approach has been to coat a mixture of polyvinyl alcohol ("PVA") and a chrome-fatty acid complex such as "QUILON®" onto a paper substrate such as pan liner paper. Alternatively, the pan liner paper may be coated with PVA followed by a coating of QUILON® metal complex of a fatty acid. The pan liner paper so coated may be added to a conventional baking tray to provide release of food from the tray. However, such pan liner paper lacks the dimensional stability and strength to be used to form an ovenable tray by itself. Furthermore, such pan liner paper provides poor food-browning and is expensive relative to less costly, more porous grades of paper, such as kraft paper or newsprint paper.

It is therefore desirable to produce a sheet material simply and economically that has the strength and dimensional stability to function as a cooking or baking tray, that may be used in both conventional and microwave ovens (i.e., that may be "dual-ovenable"), that is resistant to penetration by water moisture and by grease and oil (particularly at elevated temperatures), and that is readily gluable to form a tray or other shaped article. Furthermore, it is desirable that such a sheet material allow for superior browning of baked goods and good release of items that may be used in the tray.

SUMMARY OF THE INVENTION

The present invention includes a novel coated sheet material made by: (a) coating a porous substrate sheet material with a barrier coating composition comprised of (i) a cross-linkable polymer resistant to penetration by water moisture, and (ii) a water-disperSible film-forming polymer that is resistant to penetration by grease and oil and that is capable of being cross-linked to a fatty acid compound, said barrier coating composition forming a barrier layer on said substrate sheet material; and (b) coating said barrier layer with a release coating composition. Said coated sheet material may be folded and/or otherwise shaped, and then glued, to form a shaped article, such as a baking tray. Thus, the present invention relates to such novel coated sheet material, shaped articles made therefrom, and methods of making such coated sheet material and shaped articles.

As discussed more fully below, embodiments of the present invention can achieve a variety of desirable advantages and features. For example, embodiments of the present invention may be readily formed into trays or other shaped articles that may be used in both conventional and microwave ovens. Likewise, embodiments of the present invention provide coated sheet material that is resistant to penetration by grease and oil, and that is also resistant to penetration by water moisture. Accordingly, embodiments of the present invention can be useful as ovenable containers, as food wrappers, as receptacles, and/or as storage containers. Embodiments of the present invention may also provide an ovenable, coated sheet material that is readily biodegradable, as well as recyclable and repulpable. Superior browning of baked goods can be achieved with the use of embodiments of the present invention. Embodiments of the present invention also can provide a coated sheet material that is readily gluable with an appropriate glue or adhesive to form a shaped article such as a tray.

BRIEF DESCRIPTION OF THE DRAWINGS

The present invention is described more fully in the following detailed description of embodiments taken in conjunction with the drawings wherein:

FIG. 4 represents a flow diagram showing a manufacturing protocol for preparing a coated sheet material embodying the present invention.

FIG. 5 represents a flow diagram showing another manufacturing protocol for preparing a coated sheet material embodying the present invention.

DETAILED DESCRIPTION OF EMBODIMENTS

There has now been discovered a novel coated substrate sheet material, suitable for use in conjunction with food products, embodiments of which can be dual-ovenable and relatively biodegradable and which can provide good food release characteristics, good food browning, superior oil and grease resistance, superior water moisture resistance, and good gluability with an appropriate glue. In its preferred form, the coated substrate sheet material is comprised of a cellulose-based substrate sheet material; a barrier coating, or layer, comprised of (i) a cross-linkable polymer, such as an acrylic polymer, resistant to water moisture, and (ii) a grease-resistant, water-dispersible, film-forming polymer, preferably polyvinyl alcohol (or "PVA"); and a release coating, or layer, comprised of a trivalent or tetravalent metal ion complex of a fatty acid. The barrier coating may also include fillers, such as clays; pigments, such as titanium dioxide; and suspending or dispersing agents, such as tetra sodium pyrophosphate. For strength and stability, as well as its low cost relative to other possible substrates, the preferred substrate sheet material for use in ovenable trays embodying the present invention is E-fluted corrugated paperboard having, for example, outer plies of 33 lbs. per 1000 square feet (for each outer ply), and an internal ply of 26 lbs. per 1000 square feet.

Figure 1:
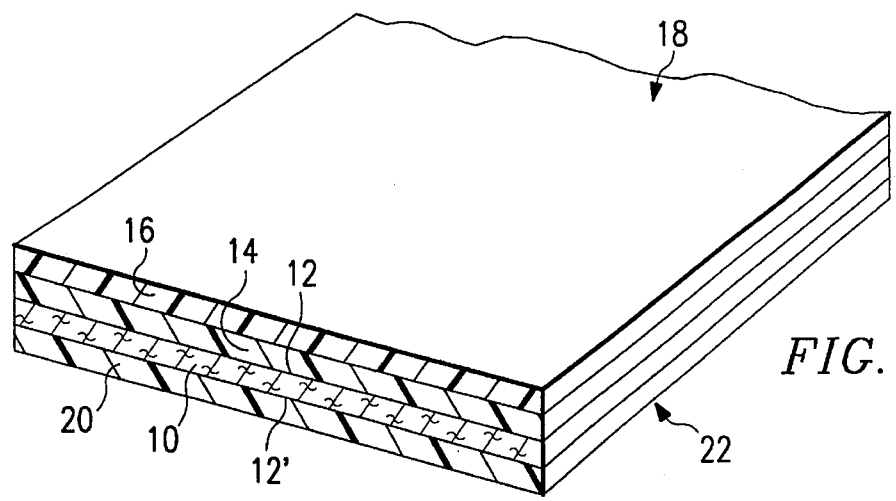
FIG. 1 represents a cross-sectional, perspective view of a coated sheet material embodying the present invention.

With reference to FIG. 1, in the preferred operation, a paper substrate sheet material 10 having oppositely disposed surfaces 12 and 12' is first coated on a surface 12 with a barrier coating 14 made from a barrier coating composition of an acrylic polymer, or resin, and PVA. The barrier coating composition may be applied, as a solution or dispersion, by roll coater, brush, doctor blade or blade coater, sprayer or other such suitable application means; however, in the manufacturing context, it will presumably be preferable to use a commercial roll coater of some sort, such as an engraved roll coater or a reverse roll coater. The barrier coating composition is applied in sufficient amount so as to provide the level of performance desired. Preferably, it is applied at a rate of about 0.5–10 lbs. per 1000 square feet, more preferably at a rate of about 2–7 lbs. per 1000 square feet of substrate, and most preferably at a rate of about 5–6 lbs. per 1000 square feet. The amount of barrier coating composition applied will vary according to the substrate used and its characteristics, such as porosity and surface roughness, as well as the rheological characteristics of the coating composition, such as viscosity. The sheet material 10 with barrier coating 14 is then allowed to dry and cure.

After drying, the substrate sheet material 10 with barrier coating 14 is coated with the release coating 16. The release coating 16, like the barrier coating 14, may be applied, as a solution or dispersion, by roll coater, brush, doctor blade or blade coater, sprayer or other such suitable application means, including manufacturing roll coaters. The release coating 16 is preferably applied at a rate of about 1–3 lbs. per 1000 square feet, and most preferably at about 2 lbs. per 1000 square feet. However, the amount applied will vary according to the type of release coating composition used, the type of substrate used, the type of barrier coating composition used, and other such variables. There must be enough release coating 16 to prevent food from sticking to the sheet material when used as an ovenable container or a food wrapper. After application of the release coating 16, the coated sheet material with release coating is then allowed to dry and cure. The release coating 16 will form the food-contacting surface 18 of the coated sheet material when it is formed into a tray 30, as depicted in FIG. 2 and 3.

An optional heat-shielding coating 20 of a polymeric composition may be applied to the other surface 12' of the substrate sheet material 10 when the coated sheet material is to be used in making an ovenable article. In such a case, the polymeric composition that forms the heat-shielding coating 20 may be applied before or after the barrier coating 14 is applied to the oppositely disposed surface 12, and preferably is applied concurrently with the application of the release coating 16 so as to provide a two-step coating process. The heat-shielding coating protects the surface 12' of the substrate sheet material 10 from oven heat during cooking. Any of a variety of polymeric compositions may be used for the heat-shielding coating 20, including, for example, PVA, acrylic polymers (or resins), styrene-butadiene polymers (or resins), mixtures and copolymers of the foregoing, mixtures and copolymers of the foregoing with QUILON® metal complex of a fatty acid, and so on. The heat-shielding coating, it may be noted, is not always necessary to prevent destruction of or damage to the sheet material by heat, but it helps to guard against this possibility. Furthermore, if a pigmented substrate sheet material is used, the heat-shielding coating prevents discoloration of the sheet material during cooking. Moreover, the heat-shielding coating may itself be pigmented to add to the aesthetic appearance of the substrate sheet material, particularly if the substrate sheet material is brown kraft paper.

Figure 2:
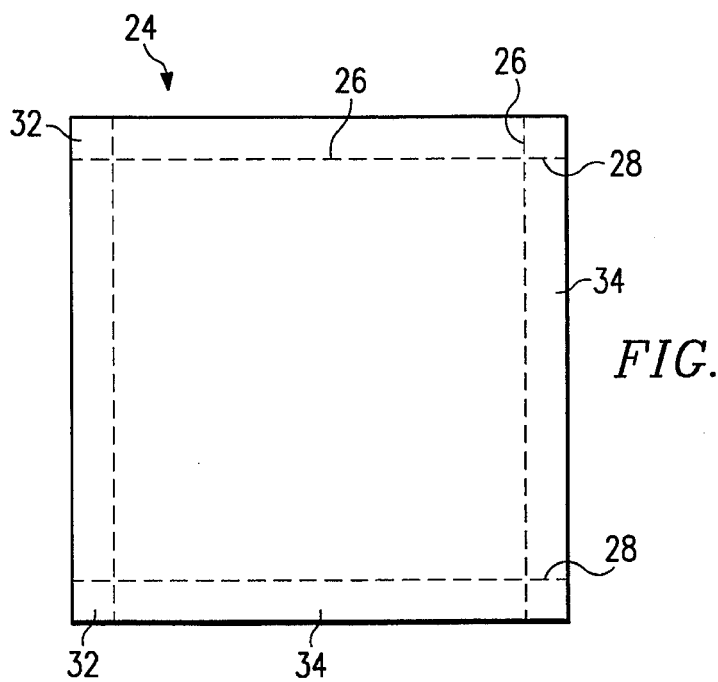
FIG. 2 represents a layout type of view of a coated sheet material embodying the present invention formed as a blank for constructing a tray, but prior to folding and adhering together portions to form a tray.
Figure 3:
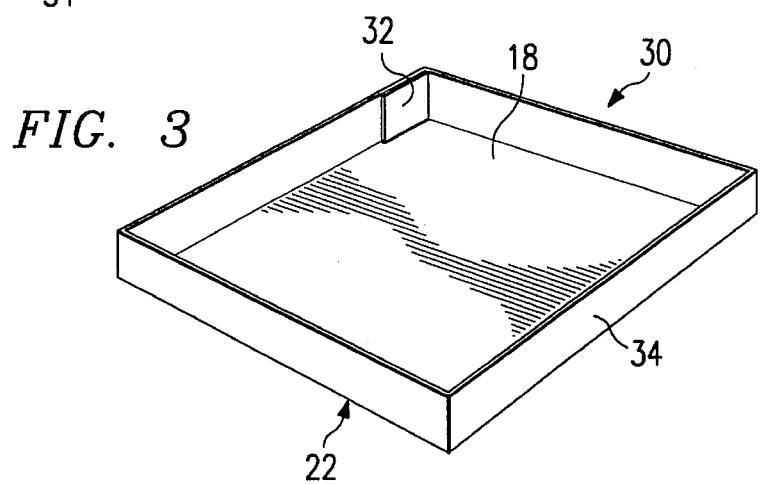
FIG. 3 represents a perspective view of a tray embodying the present invention formed from a coated sheet material as depicted in FIG. 1.

With reference to FIG. 2, the numeral 24 denotes generally the blank formed from the coated sheet material from which a shaped article, such as a tray, may be fashioned. The blank 24 has been scored, but not cut, along fold lines 26. The blank 24 has been cut along lines 28. The blank 24 may be folded along fold lines 26 to form the tray 30 depicted in FIG. 3. Fold panels 32 may be secured to sidewalls 34 by applying adhesive or glue between them. The adhesive or glue used should contain a wetting agent to permit the adhesive or glue to penetrate the release coating 16 on the coated sheet material. As shown in FIG. 3, the release coated surface forms the food-contacting surface 18 of the tray 30, while the heat-shielding coating is on non-food-contacting surface 22.

The coated sheet material may be formed into a shaped article by means other than folding and gluing, such as, for example, by pressure-forming. Such shaped articles may, but need not, be used for cooking or baking purposes. For example, the coated sheet material may be used to make a container (which, as such term is used herein, refers to any form of container of any size or shape, and regardless of whether such container fully encloses or only partially encloses an item placed therein) for storing food on a shelf (such as for storing pet food) while preventing penetration of grease, oil and/or water through the sheet material. Or the coated sheet material may be used to form a container such as a baking tray, as depicted in FIG. 3. Likewise, the coated sheet material may be used to form a food receptacle (which, as such term is used herein, refers to any surface for receiving or placing food), such as a paper plate. Or the coated sheet material may be used for fast-food containers, such as boxes for fried chicken, or food wrappers, such as wrapping materials for hamburgers and sandwiches. Thus, the coated sheet material may be used for any of a variety of applications as a food container, wrapper or receptacle.

As mentioned above, in the barrier coating composition for the coated sheet material, an acrylic polymer, or resin, is the preferred cross-linkable polymer resistant to water moisture. Such cross-linkable polymer is preferably applied to the substrate sheet material as part of a solution or dispersion. It is important that the polymer be cross-linkable in order to resist penetration by water moisture from food into the substrate sheet material at elevated temperatures. Preferred cross-linkable acrylic polymers include MICHEM COAT 50A, made by Michelman, Inc., and RHOPLEX® P-376 and RHOPLEX® B-15, made by Rohm and Haas. In addition, styrene-butadiene resins, or polymers, ("SBR") have been found to function suitably as cross-linkable polymers in the barrier coating composition, including such SBR's as MICHEM COAT 50H, made by Michelman, Inc., and Latex PB 6692NA made by Dow Chemical. Blends and/or copolymers of cross-linkable polymers may also be used. Other cross-linkable polymers, such as polyurethane polymers and various fluorochemical polymers (e.g., 3B ZONYL® 7040 made by Du Pont), may also provide the necessary barrier properties, although it may be that such polymers are not approved under FDA or other appropriate regulations relating to food contact. For purposes of using the ovenable coated sheet material for containers for cooking food, the cross-linkable polymer and other components of the coated sheet material may, of course, be subject to a variety of federal, state and other governmental regulations, such as regulation by the FDA. In this regard, in connection with food containers or wrappers, the cross-linkable polymer and other components of the coated sheet material must be non-toxic as used therein and should lack undesirable odors that could be imparted to the food.

The cross-linkable polymer preferably has a molecular weight, before curing, of greater than about 5,000. After curing, when the cross-linkable polymer is cross-linked (i.e., when monomer or comonomer repeat units are cross-linked to other monomer or comonomer repeat units in the polymer), the molecular weight of the polymer may be about 20,000 to 40,000 or greater. The cross-linkable polymer, after curing, preferably cross-links to an extent so as to provide the desired water moisture barrier properties. Preferably, the degree of cross-linking is between about 0.5% and about 2%, and more preferably between about 0.5% and about 1%, as expressed by the average weight percent of monomer or comonomer repeat units in the polymer that are cross-linked. A more specific listing of polymers that may be used as cross-linkable polymers resistant to water moisture in the barrier coating composition includes but is not limited to: polymers and copolymers of poly(dienes) such as poly(butadiene), poly(isoprene), and poly(1-penetenylene);

poly(acrylics) such as poly(benzyl acrylate), poly(butyl acrylate) (s), poly(2-cyanobutyl acrylate), poly(2-ethoxyethyl acrylate), poly(ethyl acrylate), poly(2-ethylhexyl acrylate), poly(fluoromethyl acrylate), poly(5,5,6,6,7,7,7-heptafluoro-3-oxaheptyl acrylate), poly(heptafluoro-2-propyl acrylate), poly(heptyl acrylate), poly(hexyl acrylate), poly(isobornyl acrylate), poly(isopropyl acrylate), poly(3-methoxybutyl acrylate), poly(methyl acrylate), poly(nonyl acrylate), poly(octyl acrylate), poly(propyl acrylate), and poly(p-tolyl acrylate);

poly(acrylamides) such as poly(acrylamide), poly(N-butylacrylamide), poly(N,N-dibutylacrylamide), poly(N-dodecylacrylamide), and poly(morpholylacrylamide);

poly(methacrylic acids) and poly(methacrylic acid esters) such as poly(benzyl methacrylate), poly(octyl methacrylate), poly(butyl methacrylate), poly(2-chloroethyl methacrylate), poly(2-cyanoethyl methacrylate), poly(dodecyl methacrylate), poly(2-ethylhexyl methacrylate), poly(ethyl methacrylate), poly(1,1,1-trifluoro-2-propyl methacrylate), poly(hexyl methacrylate), poly(2-hydroxyethyl methacrylate), poly(2-hydropropyl methacrylate), poly(isopropyl methacrylate), poly(methacrylic acid), poly(methyl methacrylate) in various forms such as, atactic, isotactic, syndiotactic, and heterotactic; and poly(propyl methacrylate);

poly(methacrylamides) such as poly(4-carboxy phenylmethacrylamide);

other alpha-and beta-substituted poly(acrylics) and poly(methacrylics) such as poly(butyl chloracrylate), poly(ethyl ethoxycarbonylmethacrylate), poly(methyl fluoroacrylate), and poly(methyl phenylacrylate);

poly(vinyl ethers) such as poly(butoxyethylene), poly(ethoxyethylene), poly(ethylthioethylene), (dodecafluorobutoxyethylene), poly poly(2,2,2-trifluoroethoxytrifluoroethylene), poly(hexyloxyethylene), poly(methoxyethylene), and poly(2-methoxypropylene);

poly(vinyl halides) and poly(vinyl nitriles) such as poly(acrylonitrile), poly(1,1-dichloroethylene), poly(chlorotrifluoroethylene), poly(1,1-dichloro-2-fluoroethylene), poly(1,1-difluoroethylene), poly(methacrylonitrile), poly(vinyl chloride), and poly(vinylidene chloride);

poly(vinyl esters) such as poly(vinyl acetate), poly(benzoyloxyethylene), poly(4-butyryloxybenzoyloxyethylene), poly(4-ethylbenzoyloxyethylene), poly[(trifluoroacetoxy)ethylene], poly[(heptafluorobutyryloxy)ethylene], poly(formyloxyethylene), poly[(2-methoxybenzoyloxy)ethylene], poly(pivaloyloxyethylene), and poly(propionyloxyethylene);

poly(styrenes) such as, poly(4-acetylstyrene), poly[3-(4-biphenylyl)styrene], poly(4-[(2-butoxyethoxy) methyl]

styrene), poly(4-butoxymethyl styrene), poly(4-butoxystyrene), poly(4-butylstyrene), poly(4-chloro-2-methylstyrene), poly(2-chlorostyrene), poly(2,4-dichlorostyrene), poly(2-ethoxymethyl styrene), poly(4-ethoxystyrene), poly(3-ethylstyrene), poly(4-fluorostyrene), poly(perfluorostyrene), poly(4-hexylstyrene), poly [4-(2-hydroxyethoxymethyl)styrene], poly [4-(1-hydroxy-1-methylpropyl)styrene], poly(2-methoxymethylstyrene), poly(2-methoxystyrene), poly(alpha-methylstyrene), poly(2-methylstyrene), poly(4-methoxystyrene), poly(4-octanoylstyrene), poly(4-phenoxystyrene), poly(4-phenylstyrene), poly(4-propoxystyrene), and poly(styrene);

poly(oxides) such as poly(ethylene oxides), poly(tetrahydrofuran), poly(oxetanes), poly(oxybutadiene), poly [oxychloromethyl)ethylene], poly(oxy-2-hydroxytrimethyleneoxy-1,4-phenylenemethylene-1, 4-phenylene), poly(oxy-2,6-dimethoxy-1,4-phenylene), and poly(oxy-1,3-phenylene);

poly(carbonates) such as polycarbonate of Bisphenol A, and poly[oxycarbonyloxy-4,6-dimethyl]-1,2-phenylenemethylene-3,5-dimethyl-1,2-phenylene];

poly(esters) such as poly(ethylene terephthalate), poly[(1, 2-diethoxycarbonyl)ethylene], poly[(1,2-dimethoxycarbonyl)ethylene], poly(oxy-2-butenyleneoxysebacoyl), poly[di(oxyethylene)oxyadipoyl], poly(oxyethyleneoxycarbonyl-1,4-cyclohexylenecarbonyl), poly(oxyethyleneoxyisophthaloyl), poly[di(oxyethylene)oxyoxalyl], poly[di(oxyethylene)oxysuccinyl], poly(oxyethyleneoxyterephthaloyl), poly(oxy-1,4-phenyleneisopropyiidene-1,4-phenylene oxysebacoyl), and poly(oxy-1,3-phenyleneoxyisophthaloyl);

poly(anhydrides) such as poly(oxycarbonyl-1,4-phenylenemethylene-1,4-phenyl enecarbonyl), and poly(oxyisophthaloyl);

poly(urethanes) such as poly(oxycarbonyliminohexamethyleneiminocarbonyloxydecamethylene), poly(oxyethyleneoxycarbonyliminiohexamethyleneiminocarbonyl), poly(oxyethyleneoxycarbonylimino-1,4-phenylenetrimethylene-1,4-phenyleneiminocarbonyl), poly(oxydodecamethyleneoxycarbonyliminodecamethyleneiminocarbonyl), and poly(oxytetramethyleneoxycarbonylimino-1, 4-phenylenemethylene-1,4-phenyleneiminocarbonyl);

poly(siloxanes) such as, poly(dimethylsiloxane), poly [oxy(methyl)phenylsilylene], and poly(oxydiphenylsilylene-1,3-phenylene);

poly(sulfones) and poly(sulfonamides) such as poly[oxycarbonyl di(oxy-1,4-phenylene)sulfonyl-1, 4-phenyleneoxy-1,4-phenylene], poly[oxy-1,4-phenylenesulfinyl-1,4-phenyleneoxy-1, 4-phenylenecarbonyl-1,4-phenylene), poly(oxy-1,4-phenylenesulfonyl-1,4-phenylene), and poly(sulfonyl-1,3-cyclohexylene);

poly(amides) such as nylon-6, nylon-6,6, nylon-3, nylon-4,6, nylon-5,6, nylon-6,3, nylon-6,2, nylon-6,12, and nylon-12;

poly(imines) such as poly(acetyliminoethylene), and poly(valeryl iminoethylene);

poly(benzimidazoles) such as poly(2,6-benzimidazolediyl-6,2-benzimidazolediyloctamethylene);

carbohydrates such as amylose triacetate, cellulose triacetate, cellulose tridecanoate, ethyl cellulose, and methylcellulose;

and polymer mixtures and copolymers thereof such as poly(acrylonitrile-co-styrene) with poly(e-caprolactone), or poly(ethyl methacrylate), or poly(methyl methacrylate);

Poly (acrylonitrile-co-vinylidene chloride) with poly(hexamethylene terephthalate);

Poly (allyl alcohol-co-styrene) with poly(butylene adipate), or poly(butylene sebacate); poly(n-amyl methacrylate) with poly(vinyl chloride);

bisphenol A polycarbonate with poly(e-caprolactone), or poly(ethylene adipate), or poly(ethylene terephthalate), or novolac resin;

poly(butadiene) with poly(isoprene);

poly(butadiene-co-styrene) with glycerol ester of hydrogenated rosin;

poly(butyl acrylate) with poly(chlorinated ethylene), or poly(vinyl chloride);

poly(butyl acrylate-co-methyl methacrylate) with poly(vinyl chloride);

poly(butyl methacrylate) with poly(vinyl chloride);

poly(butylene terephthalate) with poly(ethylene terephthalate), or poly(vinyl acetate-co-vinylidene chloride);

poly(e-caprolactone) with poly(chlorostyrene), or poly(vinyl acetate-co-vinylidene chloride);

cellulose acetate with poly(vinylidene chloride-co-styrene);

cellulose acetate-butyrate with poly(ethylene-co-vinyl acetate);

poly(chlorinated ethylene) with poly(methyl methacrylate);

poly(chlorinated vinyl chloride) with poly(n-butyl methacrylate), or poly(ethyl methacrylate), or poly(valerolactone);

poly(chloroprene) with poly(ethylene-co-methyl acrylate);

poly(2,6-dimethyl-1,4-phenylene oxide) with poly(a-methylstyrene-co-styrene styrene), or poly(styrene);

poly(ethyl acrylate) with poly(vinyl chloride-co-vinylidene chloride), or poly(vinyl chloride);

poly(ethyl methacrylate) with poly(vinyl chloride);

poly(ethylene oxide) with poly(methyl methacrylate);

poly(styrene) with poly(vinyl methyl ether); and poly(valerolactone) with poly(vinyl acetate-co-vinylidene chloride).

In connection with the cross-linkable polymer resistant to penetration by water moisture, it may be beneficial to enhance and expedite cross-linking by any suitable means, such as by heat or by addition of a cross-linking agent. Heating the barrier coating composition after application thereof will generally speed up the cross-linking process. The addition of a cross-linking agent may enhance the degree of cross-linking achieved by the polymer and may thereby enhance the ovenability of the barrier coating, particularly as used in conventional ovens. As an example, with an acrylic polymer, it may be useful to add an ammonium zirconium carbonate cross-linking agent to the acrylic polymer before mixing the acrylic polymer with other components of the barrier coating, described more fully below. In addition, when such a cross-linking agent is used with an acrylic polymer, it may also be beneficial to add a small amount of an SBR to provide flexibility in the coating and prevent cracking thereof if the coated sheet material is folded to make a shaped article.

As previously noted, the water-dispersible, film-forming polymer in the barrier coating composition is preferably PVA. The term "water-dispersible," as used herein is intended to include water-soluble compounds (such as PVA), as well as compounds that may be dispersed in or borne by (i.e., "water-borne") an aqueous mixture even though the compound is not actually soluble in water. The water-dispersible, film-forming polymer is generally applied to the substrate sheet material as part of a solution or dispersion including the cross-linkable polymer resistant to water moisture, although the two polymers need not be applied as part of a single solution or dispersion. Other suitable water-dispersible, film-forming polymers may include poly(butylene alcohol), poly(propylene alcohol), polyvinyl acetate, poly(hydroxyethyl acrylate), copolymers of any of the foregoing, and other such hydroxylated, water-dispersible polymers. The water-dispersible, film-forming polymer, by forming a relatively continuous film over the porous substrate, serves to resist penetration by grease and oil into the substrate sheet material and, furthermore, binds to the release coating. Of course, for use in connection with food, the water-dispersible, film-forming polymer should also be non-toxic and should lack undesirable characteristics such as an unpleasant odor. It should also meet appropriate federal, state and other governmental regulations.

The ratio of water-dispersible, film-forming polymer to cross-linkable polymer in the barrier coating composition, by weight of the solids of such polymers, can vary widely but is preferably between about 0.25:1 and about 0.9:1, particularly when PVA is the water-dispersible, film-forming polymer and an acrylic polymer is the cross-linkable polymer. The most preferred ratio, by weight solids, of PVA to acrylic polymer is about 0.67:1. Without being bound by the following theory, it is believed that the ratio of water-dispersible, film-forming polymer to cross-linkable polymer can contribute to the degree of food-browning obtained when the coated sheet material is used, for example, in an ovenable baking tray. In general, it has been observed that greater degrees of browning are achieved with higher ratios of water-dispersible, film-forming polymer to cross-linkable polymer.

The barrier coating composition may also preferably contain a small amount of filler. For example, commercially available clay fillers have been found to be suitable for use in the barrier coating. The filler gives the coating the desired consistency and, it is believed, helps to maintain the barrier coating on the surface of the substrate sheet material, thus optimizing the grease, oil and water resistance properties of the sheet material. Appropriate fillers may also enhance the inherent barrier properties of the barrier coating composition. Without being bound by the following theory, it may be that the filler helps bridge pores and voids in the substrate and thereby helps prevent seepage of the barrier coating into the substrate. Preferred clay filler materials for the barrier coating include, for example, KAOMER 350™ clay (made by Dry Branch Kaolin Company) and KAOPEQUE 10™ (also made by Dry Branch Kaolin Company). Other filler materials, such as calcium carbonate (e.g., precipitated calcium carbonate made by Pfizer Inc.), metal flakes, micas, silicas and the like may also be used.

Pigment may be added to the barrier coating composition to give the surface of the coated sheet material a desired appearance. For example, it may be desired that the food-contacting surface of the coated sheet material be a white color. If brown kraft paper is used as the substrate sheet material, titanium dioxide may be added to the barrier coating composition to make it white and to make the food-contacting surface of the sheet material white when the barrier coating composition is applied. It has been found that pigments such as TI-PURE® 900, a titanium dioxide pigment made by DuPont, are suitable pigments for the barrier coating. Other pigments may be suitable so long as they do not significantly degrade the performance of the barrier coating composition.

In addition, a dispersing agent may be added to the barrier coating composition to help disperse and suspend the filler and pigment particles in the coating before application, and to stabilize the suspension. Any of a variety of dispersing agents may be used. For example, it has been found that dispersing agents such as tetra sodium pyrophosphate ("TSPP") and sodium hexa meta phosphate are suitable for this purpose.

The release coating inhibits sticking of food material to the surface of the coated sheet material. The release coating composition is preferably comprised of a metal complex of a fatty acid, such as QUILON metal complexes of fatty acids. QUILON Metal complexes of fatty acids are a Werner chrome complex of a fatty acid and is manufactured by Du Pont. QUILON® L metal complexes of fatty acids have has been found to be particularly suitable. Other suitable release coating materials include, for example, iron(+3)-fatty acid complexes and titanium(+4)-fatty acid complexes. It has been found that best results are achieved with a trivalent or tetravalent metal complex of a fatty acid, such as those mentioned above.

When such metal complexes of fatty acids are coated onto the barrier coating, it appears that the positively-charged metal ion portion of the metal complex binds to negatively-charged sites (particularly hydroxyl sites) in the water-dispersible, film-forming polymer. The formula for such metal complexes may generally be described as: $M^{+n}(RCO_2)_y$, wherein M is a metal ion, such as iron, titanium, chromium, vanadium, etc.; n is an integer equal to or greater than 3; R is an alkyl chain having from 6 to 30 carbon atoms; and y is an integer equal to or greater than 1.

It may be desirable to add a minor amount of fine metal powder or flakes, such as aluminum powder or flakes, to the barrier coating composition or release coating composition as a susceptor material. Such susceptor material may enhance browning and crisping of foodstuffs that are cooked on the coated sheet material in a microwave oven. Susceptors generally allow for browning or crisping in microwave ovens by heating up when exposed to microwave energy, and transferring such heat to the foodstuff resting on or adjacent to the susceptor. However, too much susceptor material should be avoided because an excess of susceptor material will cause arcing in a microwave oven.

The substrate sheet material is preferably porous (i.e., having pores or voids, as cellulose-based sheet materials have, and therefore not being completely impervious to water or oil) and is preferably made of a cellulosic material, or a cellulose-based material, such as paper or paper-like materials. It has been noted that the barrier coating composition may be particularly useful for coating substrate sheet materials having Gurley porosity values of less than about 60 s/100 cm³ air, and particularly between about 20 s/100 cm³ and about 60 s/cm³ (lower values indicating higher porosities). Paper sheet materials that may be used include, for example, corrugated paperboard (or "cardboard"), newsprint paper, uncorrugated kraft paper stock, pan liner paper stock, and the like. In addition to paper and paper-like materials, other cellulose-based sheet materials, such as pressed board, may also be suitable. It is also possible to use other fibrous materials for the substrate sheet material. In significant part, the choice of substrate will depend on economic concerns—low cost substrates being preferred in this regard—and the intended use of the coated sheet material. When the coated sheet material is to be used for a self-supporting baking tray, a stronger and more dimensionally stable substrate (such as corrugated paperboard) may be preferred. When the coated sheet material is to be used for a food wrapper (such as a wrapping material for a hamburger), less dimensionally stable sheet materials may be suitable.

In one particularly preferred embodiment for use in making a baking tray, an E-fluted corrugated paperboard having three plies of kraft paper is used for the substrate sheet material. As noted above, such E-fluted corrugated paperboard is commonly referred to as "cardboard" and may be obtained, for example, from Willamette Industries. Without being bound by the following theory, it is believed that such corrugated paper, having air space in the interior flutes, enhances the even distribution of heat over the tray surface and enhances browning. For ovenable product embodiments of the present invention, corrugated paperboard having outer plies of between about 10 and 40 lbs. per 1000 square feet for each outer ply are suitable, and corrugated paperboard having outer plies of between 20 and 40 lbs. per 1000 square (for each outer ply) are preferred. For example, for such ovenable product embodiments, corrugated paperboard having outer plies of about 33 lbs. per 1000 square feet (for each outer ply) and about 26 lbs. per square feet for the inner ply has been found to be suitable.

In the manufacturing context, when corrugated paper is to be used as the substrate sheet material, it may be useful to apply the barrier coating composition and the release coating composition to kraft paper prior to incorporating the kraft paper into a corrugated sheet. For example, as shown in the flow diagram set forth in FIG. 4, kraft-processed paper manufactured at a paper mill may be prepared in rolled stock of 33 lbs. per 1000 square feet (step C). A barrier coating composition (steps A and B) pigmented white, as described above, may be applied to one surface of the rolled brown stock by roll coating at the paper mill (step D), thereby creating a kraft paper rolled stock with barrier coating on one side. This coated stock may be shipped to a corrugator, and there, the release coating composition may be applied to the barrier coating on the rolled stock (steps E and F). A separate roll stock of kraft paper may be coated on one surface with a heat-shielding polymeric composition (steps G and H). These roll stocks may then be used to manufacture corrugated kraft paper having one outer ply with a barrier coating and release coating on one outside surface of the corrugated structure, and one outer ply with a heat-shielding coating on the other outside surface of the corrugated structure (step I). The release coating and heat-shielding coating are preferably applied concurrently, so that only a two step coating process is required. The inner ply may be, for example, a sheet of kraft paper of 26 lbs. per 1000 square feet. The coated corrugated sheet material so prepared may then be sent to a die-cutter to cut into shapes of desired form (step J), and then formed into a shaped article, such as a tray (step K).

While the manufacturing process described in the flow diagram of FIG. 4 may be preferred for manufacturing coated corrugated sheet material embodiments of the present invention, said process is by no means the only process that may be used for manufacturing coated sheet material embodiments of the present invention. For example, as described in the flow diagram in FIG. 5, a barrier coating composition (steps a and b) (referred to in FIG. 5 as the "GR coating") may be applied to a cellulose-based sheet material roll stock manufactured at a paper mill (step c) in a coating operation (step d), followed by coating (step f) with the release coating composition (prepared in step e) and then die-cutting the coated sheet material (step g). Other processes are also possible.

Compared with prior attempts, the present invention represents a truly unique approach to designing an ovenable sheet material, and shaped articles therefrom, having various desirable properties and being simple and economical in design and construction. As noted above, embodiments of the present invention achieve excellent release of foodstuffs from the cooking surface while resisting penetration of grease, oil and water into the sheet material. Embodiments of the present invention, moreover, may be made with strong, low-cost substrates, such as cardboard, and can achieve good biodegradability, as well as recyclability and repulpability. The present invention also allows for excellent browning of baked goods. Furthermore, embodiments of the present invention as described allow for ready construction of shaped articles using appropriate glues or adhesives, and, hence, may dispense with the need for clip-lock designs or pressure-forming processes. Shaped articles embodying the present invention may be made for use in either conventional or microwave ovens, or, in view of the barrier properties exhibited by embodiments of the present invention, may be used in non-cooking applications as food wrappers, containers or receptacles.

The following examples are offered illustratively:

EXAMPLE 1

A barrier coating composition of the following formulation was prepared:

| | |
|---|---|
| 50 g | polyvinyl alcohol solution (prepared by dissolving 1 part by weight Du Pont Elvanol 71-30 in 10 parts by weight $H_2O$) |
| 30 g | Michem ® coat 50A acrylic polymer, obtained from Michelman, Inc. (total solids content of approximately 34.5–35.5%) |
| 15 g | Kaomer 350 ™ clay, obtained from Kaolin Company |
| 15 g | Ti-Pure ® R-900 titanium dioxide, obtained from Du Pont |
| 0.2 g | TSPP, from Monsanto |
| 10 g | $H_2O$ |

This barrier coating composition was prepared by first preparing the polyvinyl alcohol solution by mixing 1 part by weight ELVANOL 71-30 (in powder form) in 10 parts by weight water and stirring until the ELVANOL 71-30 was wetted out. This PVA solution was then heated for about 13–14 minutes at 200° F. while stirring, and then allowed to cool to room temperature. All of the ingredients of the barrier coating composition were then placed in an Oster® blender and mixed for about 1–2 minutes, until the composition was smooth and uniform. (The ratio of PVA to acrylic polymer, by weight solids of each, was 0.43:1—i.e., (50 g PVA solution×9% solids)÷(30 g acrylic polymer×34.5% solids)=0.43.) The composition was then coated on a 7" by 5½ E-fluted corrugated paperboard having outer plies of 33 lbs. per 1000 square feet (for each outer ply) and an inner ply of 26 lbs per 1000 square feet, such paperboard being supplied by Willamette Industries. The outer plies were reported to have Gurley porosity values of 40 s/100 cm³, ±16 s/100 cm³. The coating composition was applied with the use of a squeegee at an application rate of approximately 3 lbs. per 1000 square feet. The coated sheet material was then dried and cured for about 5 seconds in an oven at 400° F.

A release coating composition was prepared by dissolving 2 g QUILON® L chrome complex, obtained from Du Pont, in 98 g H₂O. The Quilon® metal complex of a fatty acid solution was then neutralized with urea formic acid to a pH of about 3. The solution was allowed to sit at room temperature for thirty minutes, after which the pH had stabilized at about 3.5–4. The QUILON® metal complex of a fatty acid solution was applied, with the use of a squeegee, on the dried barrier coating at a rate of about 2 lbs. per 1000 square feet. The coated sheet material was then placed in an oven for about 5 seconds at about 350° F. to allow the release coating to dry and cure and to bind to the barrier coating.

To protect the backside of the paper tray from oven heat during cooking, the back surface of the sheet material (i.e., the non-food-contacting surface) was also coated with a polymeric composition. This composition was applied after application of the barrier coating composition and release coating composition to the oppositely-disposed food-contacting surface. The heat-shielding polymeric composition was comprised of the following formulation:

| | |
|---|---|
| 2.5 g | polyvinyl alcohol solution (Elvanol 71-30 diluted to 9% solids) |
| 1 g | Quilon ® L |
| 10 g | titanium dioxide |
| 2 g | lake yellow |
| 0.3 g | TSPP |
| 10 g | calcium carbonate |
| 25 g | H₂O |

These ingredients were mixed for 1–2 minutes in an Oster® blender prior to application. The heat-shielding polymeric composition was applied at a rate of approximately 3 lbs. per 1000 feet. The sheet material, coated with the heat-shielding polymeric composition, was then placed in an oven for about 5 seconds at 400° F. to dry and cure.

A tray was formed by scoring, cutting and folding the corners of the sheet material in the manner depicted in FIG. 3 and 4, and applying an appropriate adhesive to the folds of the tray. The adhesive was Adhesive No. 5041.00 obtained from Timminco Universal Adhesives in Memphis, Tenn. this adhesive included wetting agent "Aerosol OT," which it is believed, allowed, penetration into the QUILON® release layer. Thus folded, the release layer formed the surface of the interior of the tray on which food would be placed.

The tray so formed was used to bake 10 Winn Dixie™ cinnamon rolls in a conventional oven for about 14 minutes at 400° F. After cooking, the pan was allowed to cool at room temperature (about 72° F.) for a period of about one hour. The rolls were removed by quickly turning the pan over and allowing the rolls to release from the surface. Release was 100%. The rolls exhibited excellent browning.

Resistance to grease, oil and water moisture was determined, after removing a cinnamonn roll from the tray, by measuring the approximate percentage of the total area of the tray surface directly under the roll that was stained as a result of penetration by grease, oil or water moisture. Such measurements were taken for 10 cinnamon rolls, and, for each roll, the area of the roll surface touching the tray was 2"×2", or 4 square inches. A stained area of less than 10% of the total area was considered good, while a stained area of more than 20% was considered poor. The tray of this Example exhibited excellent grease, oil and water moisture resistance, showing no staining.

EXAMPLE 2

For comparative purposes, five trays were formed using different coating compositions, and two trays were formed using extruded, biaxially-oriented PET films. For all trays, a heat-shielding coating composition was applied as described in Example 1 to one surface of a paper substrate as in Example 1. Furthermore, for trays 1 through 4, the trays were formed from dual-ovenable sheet material prepared as in Example 1, except as follows. For tray 1, the barrier coating composition of Example 1, but without any PVA solution, was applied, and no release coating was used. For tray 2, the barrier coating composition of Example 1 was applied, and, again, no release coating was used. For tray 3, the barrier coating composition of Example 1, but without any PVA solution, was applied, followed by application of a release coating as described in Example 1. Tray 4 was made fully in accordance with Example 1. For tray 5, no barrier coating and no release coating were applied.

Trays 6 and 7 were made with extruded, biaxially-oriented PET films. For tray 6, a MYLAR® PET film, without a silicone release layer, was glued to E-fluted corrugated paperboard of the type referred to in Example 1. For tray 7, a PET film laminate known and sold as "QRX paperboard," with a silicone release layer on the PET film, was used. All of the trays were used to bake Winn Dixie™ cinnamon rolls. The results are set forth in Table 1.

TABLE 1

| Tray No. | Barrier | Release | % Release | Browning | Grease, H₂O Resistance | Gluability |
|---|---|---|---|---|---|---|
| 1 | Acrylic | None | 0 | Poor | Poor | Poor |
| 2 | Acrylic + PVA | None | 0 | Fair | Good | Pass |
| 3 | Acrylic | Quilon ® | 50 | Poor | Poor | Pass |
| 4 | Acrylic + PVA | Quilon ® | 100 | Excellent | Excellent | Pass |
| 5 | None | None | 0 | N/A | Poor | Pass |
| 6 | PET | None | 0 | Fair | Excellent | Pass |
| 7 | PET | Silicone | 50 | Fair | Excellent | Fail |

These results show that the release coating was necessary to obtain good release of the baked goods and good browning thereof. Furthermore, when the water-dispersible, film-forming polymer was excluded from the coating composition for trays 1–5, the coated sheet material failed with respect to release and browning characteristics and with respect to grease and water resistance. Furthermore, the embodiment of the present invention (tray 4) exhibited improved gluability as compared to commercially available PET laminate with silicone release coating, which failed with respect to gluability. When no release coating was used with the PET film, the PET film failed with respect to release characteristics.

EXAMPLE 3

A dual-ovenable tray was formed as in Example 1, except that in the barrier coating formulation, 30 g of RHOPLEX® P-376 (an acrylic polymer obtained from Rohm and Haas) was used instead of the MICHEM® coat 50A acrylic polymer. RHOPLEX®P-376 is a cross-linkable acrylic polymer. The dual-ovenable tray of this Example exhibited excellent browning, excellent grease resistance, excellent water moisture resistance, and good gluability. All of the cinnamon rolls released when the tray was turned over.

EXAMPLE 4

A dual-ovenable tray was formed as in Example 1, except that in the barrier coating formulation, 30 g of Latex PB 6692NA (a styrene-butadiene resin ("SBR") obtained from Dow Chemical) was used instead of the Michem® coat 50A acrylic polymer. Latex PB 6692NA is a cross-linkable SBR. The dual-ovenable tray of this Example exhibited excellent browning, excellent grease resistance, excellent water moisture resistance, and good gluability. All of the cinnamon rolls released when the tray was turned over. However, it was noted that, because there were portions of the interior tray surface exposed to air and not covered by a cinnamon roll, the SBR created an odor that would generally be undesirable for cooking purposes.

EXAMPLE 5

A dual-ovenable tray was formed as in Example 4. A Betty Crocker™ devil's food cake was baked in the tray at a temperature of about 350° F. for 30 minutes, the cake material filling substantially all of the tray so that almost no portion of the interior surface of the tray was exposed to air during baking. The tray exhibited excellent grease resistance, excellent water moisture resistance, and good gluability. The cake released easily when the tray was turned over and the cake pried gently with a knife. No unpleasant odor was generated by the SBR, apparently because almost no portions of the interior tray surface were exposed to air during baking.

EXAMPLE 6

Two dual-ovenable trays were formed as in Example 1, except that in the release layer formulation, an iron(+3)-fatty acid (stearic acid) complex was used for one tray, and a titanium(+4)-fatty acid (stearic acid) complex was used for the other tray. Although it is not known whether these metal-fatty acid complexes would meet FDA and/or other relevant federal or state regulations for cooking materials, the trays formed in this Example exhibited the same highly-acceptable performance in end-use performance tests as those of Examples 1, 3, 4 and 5.

EXAMPLE 7

A barrier coating composition of the following formulation was prepared:

| | |
|---|---|
| 50 g | polyvinyl alcohol solution (prepared by dissolving 1 part by weight Du Pont Elvanol 71-30 in 10 parts by weight H$_2$O) |
| 20 g | Rhoplex ® P-376 acrylic polymer (total solids content of approximately 35%) |
| 1.5 g | Ammonium zirconium carbonate solution (Bacote ™ 20 obtained from Magnesium Elektron, Inc.) |
| 10 g | Kaopeque-10 ™ |
| 15 g | Ti-Pure ® R-900-38 |
| 1 g | TSPP |
| 5 g | Styrene-butadiene resin (product no. X30560.50 from Dow Chemical) |

This barrier coating composition was prepared by first preparing the polyvinyl alcohol solution as described in Example 1. Next, the Rhoplex® P-376 acrylic polymer (which, as supplied by Rohm & Haas, was approximately 50% solids) was diluted with water to about 35% solids. The ammonium zirconium carbonate—a cross-linking agent was then added to the Rhoplex® P-376, and the Rhoplex® P-376 with cross-linking agent was allowed to sit for about twenty minutes. All of the above-listed ingredients of the barrier coating composition, except the styrene-butadiene resin ("SBR"), were then placed in an Oster® blender and mixed for about 1–2 minutes, until the composition was smooth and uniform. At this time, the SBR was added and blended in gently by stirring by hand for about 3 seconds. The composition was coated on a 7" by 5½" E-fluted corrugated paperboard as described in Example 1, using a squeegee in applying the coating composition. The sheet material so coated was dried and cured for about 5 seconds in an oven at 400° F. A release coating composition was then prepared and applied as described in Example 1.

The coated sheet material was preliminarily tested for resistance to penetration by water by holding the coated sheet material at a 45° angle and, with an eyedropper, placing a drop of water on the surface of the coated sheet material. The drop of water ran down and off the coated sheet material without leaving a mark, which indicated that a sufficient amount of release coating composition and barrier coating composition had been used and coated evenly over the substrate sheet material. (If the drop of water leaves a mark or trace, it may indicate either an insufficient amount of barrier coating composition or release coating composition, or that either or both of such compositions are not evenly coated over the surface of the substrate sheet material.)

Two trays were formed from the coated sheet material in the manner described in Example 1. One tray so formed was used to bake 10 Winn Dixie™ cinnamon rolls in a conventional oven at 400° F. for about 14 minutes. The other tray was used to bake 10 Pillsbury™ cinnamon rolls at 400° F. for about 14 minutes. After baking, all of the rolls exhibited excellent browning. The trays formed in this Example exhibited superior performance in the end-use performance tests described in Example 1: 100% release, excellent browning, excellent grease and water resistance, and a passing grade on the gluability test. In the case of the Pillsbury™ cinnamon rolls, which tend to adhere more to baking pans than do the Winn Dixie™ cinnamon rolls, some of the rolls required gentle prodding with a fork to release from the tray, but no portions (or residues) of the rolls remained stuck to the tray.

EXAMPLE 8

A dual-ovenable tray was formed as in Example 1, except that no acrylic polymer was added to the barrier coating composition. Rather, the following barrier coating composition was used:

| | |
|---|---|
| 50 g | polyvinyl alcohol solution (Evanol 71-30 diluted to 9% solids) |
| 15 g | Kaopeque-10 ™ |
| 15 g | Ti-Pure ® R-900 |
| 1 g | TSPP |
| 10 g | H₂O |

This barrier coating composition was prepared as in Example 1, except, as noted above, no acrylic polymer was added to the composition. The barrier coating composition was coated on a sheet material as described in Example 1, and a release coating composition was also prepared and applied as described in that Example. No heat-shielding composition was used.

A tray formed from this coated sheet material was used to cook 10 Winn Dixie™ cinnamon rolls in a conventional oven at 400° F. for about 14 minutes. Another tray formed from this coated sheet material was used to bake a Betty Crocker™ devil's food cake at 350° F. for about 30 minutes. The tray with the cinnamon rolls did not exhibit good release characteristics; even after prodding with a fork, a residue of the rolls remained stuck to the tray. The tray with the cake exhibited satisfactory release characteristics. Both trays fared poorly in the test for water and grease resistance. Accordingly, this Example demonstrates the necessity of using, in the barrier coating, a cross-linkable polymer resistant to penetration by water moisture.

EXAMPLE 9

In this Example, a brightness meter was used to compare the browning characteristics of a tray embodying the present invention against the browning characteristics of pan liner paper, which was obtained from American Food Products. The pan liner paper was placed on the surface of a tray formed from uncoated corrugated paperboard as described as the substrate sheet material (before coating) in Example 1. Tray B of this Example was formed in accordance with Example 7. Six Winn Dixie™ cinnamon rolls were baked in each tray at 400° F. for about 14 minutes. The rolls were then removed from the trays and visually compared. The rolls from Tray B were distinctly more brown than the rolls from Tray A, which were generally light brown and almost white.

The brownness of the cinnamon rolls was further determined by measuring reflectance with a brightness meter with directional reflectance at 457 nm. The test was conducted in accordance With TAPPI test method T 452 om-87, which is generally used to measure the brightness of white, near-white and naturally-colored pulp, paper and paperboard. The test measures the percent of reflectance of light based on the reflectance of magnesium oxide of 100.0%. Thus, a higher percent reflectance indictes higher whiteness. For each of the rolls, three brightness readings were taken (from different regions of the roll), and regions having cinnamon powder were avoided for the readings. The results were as follows:

| | TRAY A ROLLS | TRAY B ROLLS |
|---|---|---|
| Roll 1 | 27.3, 27.6, 38.5 | 17.8, 17.0, 19.2 |
| Roll 2 | 28.4, 35.6, 38.9 | 18.2, 28.9, 17.2 |
| Roll 3 | 34.0, 30.6, 26.5 | 23.0, 25.3, 27.6 |
| Roll 4 | 30.9, 31.3, 26.9 | 25.0, 24.7, 24.4 |
| Roll 5 | 26.3, 32.0, 31.4 | 30.0, 26.3, 21.2 |
| Roll 6 | 30.9, 31.0, 32.4 | 22.0, 23.2, 26.4 |
| Average | 31.1 | 23.2 |

The lower average reflections of the rolls from Tray B is indicative of the increased browning achieved with embodiments of the present invention as compared to pan liner paper.

EXAMPLE 10

In this Example, a tray formed as in Example 1 was tested for biodegradability against an extruded PET laminate tray, as described with respect to tray 7 in Example 2. The test for biodegradability was conducted by burying each tray approximately 1 foot deep in the ground, in close proximity to each other. The trays were dug up three months later. The tray of the present invention had completely degraded. In contrast, while the paperboard substrate of the PET laminate had degraded, the PET film of the PET laminate tray had not degraded at all.

EXAMPLE 11

In this Example, a tray formed as in Example 1 was tested for recyclability and repulpability. The test for recyclability and repulpability was conducted by tearing up the tray formed as in Example 1 into pieces approximately 1"×1½". The torn pieces were placed in water and the pH was adjusted to about 10.5 at a water temperature of about 60° C. The torn-up coated sheet material comprised 1.2% by weight of the mixture. The mixture was placed in a TAPPI-standard T-205 disintegrator, which was run at 3000 r.p.m. for 50,000 revolutions. After disintegrating, the mixture was diluted until the pulp portion comprised 0.3% by weight. A hand sheet was then formed from the pulp. After forming, slight specks of coating were evident in the sheet, but no noticable pieces of paper stock were visible.

The foregoing description of specific embodiments of the invention will so fully reveal the general nature of the invention that others can, by applying current knowledge, readily modify and/or adapt for various applications such specific embodiments without departing from the engineering concept, and, therefore, such adaptations and modifications should and are intended to be comprehended within the meaning and range of the invention. It is to be understood that the phraseology and terminology employed herein is for the purposes of description and not of limitation.

What is claimed is:

1. A coated sheet material comprised of:
   (a) a porous substrate sheet material comprised of cellulose material having at least two oppositely disposed surfaces;
   (b) a barrier coating on at least one surface of said substrate sheet material wherein said barrier coating is a blend comprised of: (i) a cross-linkable polymer that is resistant to penetration by water moisture when cured, and (ii) a water-dispersible, film-forming polymer that is resistant to penetration by grease and oil when cured to form a barrier layer on said substrate sheet material; and (c) a release coating on said barrier layer wherein said release coating comprises a fatty acid complex of a metal ion in an oxidation state equal to or greater than 3, wherein said fatty acid complex of a metal ion is crosslinked to said water-dispersible, film-forming polymer in said barrier layer.

2. A coated sheet material according to claim 1, wherein said substrate sheet material is comprised of cellulose.

3. A coated sheet material according to claim 1, wherein said cross-linkable polymer is an acrylic polymer.

4. A coated sheet material according to claim 1, wherein said cross-linkable polymer is a styrene-butadiene resin.

5. A coated sheet material according to claim 1, wherein said cross-linkable polymer has an average molecular weight before curing of greater than 5,000 and is selected from the group consisting of: poly(dienes), poly(methacrylics), poly(acrylamides), poly(methacrylic acids), poly(vinyl ethers), poly(vinyl halides), poly(vinyl esters) and hydrolyzed or partially hydrolyzed versions thereof, poly(styrenes), poly(oxides), poly(carbonates), poly(esters), poly(anhydrides), poly(urethanes), poly(siloxanes), poly(sulfones), poly(sulfonamides), poly(amides) poly(imines), poly(benzimidazoles), and carbohydrates, and copolymers derived from any of the foregoing.

6. A coated sheet material according to claim 1, wherein said water-dispersible, film-forming polymer is a polyvinyl alcohol.

7. A coated sheet material according to claim 1, wherein said water-dispersible, film-forming polymer is selected from the group consisting of: poly(butylene alcohol), poly(propylene alcohol), poly(hydroxyethyl acrylate), and polyvinyl acetate, and copolymers derived from any of the foregoing.

8. A coated sheet material according to claim 1, wherein said fatty acid compound is a trivalent or tetravalent metal complex of a fatty acid.

9. A coated sheet material according to claim 1, wherein said release coating is comprised of a chrome complex of a fatty acid.

10. A coated sheet material according to claim 2, wherein said substrate sheet material has a basis weight of between about 20 pounds per 1000 square feet of sheet material and about 40 pounds per 1000 square feet of sheet material.

11. A coated sheet material according to claim 2, wherein said substrate sheet material is a corrugated sheet material.

12. A coated sheet material according to claim 2, wherein said coated sheet material is ovenable in a conventional oven at temperatures of about 400° F.

13. A coated sheet material according to claim 12, wherein said coated sheet material is dual-ovenable.

14. A coated sheet material for use in forming a food wrapper, container or receptacle, said coated sheet material being comprised of:

(a) a substrate sheet material comprising cellulose having at least two oppositely disposed surfaces and having a basis weight of between about 20 pounds per 1000 square feet of sheet material and about 40 pounds per 1000 square feet of sheet material;

(b) a barrier coating on at least one surface of said substrate sheet material wherein said barrier coating is a blend comprised of: (i) a cross-linkable polymer that is resistant to penetration by water moisture when cured, and (ii) a water-dispersible, film-forming polymer that is resistant to penetration by grease and oil when cured to form a barrier layer on said substrate sheet material; and (c) a release coating on said barrier coating, wherein said release coating is comprised of a trivalent or tetravalent metal complex of a fatty acid, wherein said trivalent or tetravalent metal complex of a fatty acid is crosslinked to said water-dispersible, film-forming polymer in said barrier layer.

15. A coated sheet material according to claim 14, wherein said substrate sheet material is a corrugated sheet material.

16. A coated sheet material according to claim 14, wherein said cross-linkable polymer is an acrylic polymer.

17. A coated sheet material according to claim 14, wherein said cross-linkable polymer is a styrene-butadiene resin.

18. A coated sheet material according to claim 14, wherein said cross-linkable polymer has an average molecular weight before curing of greater than 5,000 and is selected from the group consisting of: poly(dienes), poly(methacrylics), poly(acrylamides), poly(methacrylic acids), poly(vinyl ethers), poly(vinyl halides), poly(vinyl esters), poly(styrenes), poly(oxides), poly(carbonates), poly(esters), poly(anydrides), poly(urethanes), poly(siloxanes), poly(sulfones), poly(sulfonamides), poly(amides), poly(imines), poly(benzimidazoles), and carbohydrates, and copolymers derived from any of the foregoing.

19. A coated sheet material according to claim 14, wherein said coated sheet material is ovenable in a conventional oven at temperatures of about 400° F.

20. A coated sheet material according to claim 19, wherein said coated sheet material is dual-ovenable.

21. A coated sheet material for use in forming a food wrapper, container or receptacle, said coated sheet material being comprised of:

(a) a substrate sheet material comprised of cellulose having at least two oppositely disposed surfaces and having a basis weight of between about 20 pounds per 1000 square feet of sheet material and about 40 pounds per 1000 square feet of sheet material;

(b) a barrier coating on at least one surface of said substrate sheet material wherein said barrier coating is a blend comprised of: (i) a cross-linkable polymer that is resistant to penetration by water moisture when cured, and (ii) a polyvinyl alcohol that is resistant to penetration by grease and oil when cured; and (c) a release coating on said barrier coating, wherein said release coating is comprised of a trivalent or tetravalent metal complex of a fatty acid wherein said trivalent or tetravalent metal complex of a fatty acid is crosslinked to said polyvinyl alcohol in said barrier layer.

22. A coated sheet material according to claim 21, wherein said substrate sheet material is a corrugated sheet material.

23. A coated sheet material according to claim 21, wherein said cross-linkable polymer is an acrylic polymer.

24. A coated sheet material according to claim 21, wherein said cross-linkable polymer is a styrene-butadiene resin.

25. A coated sheet material according to claim 21, wherein said cross-linkable polymer has an average molecular weight before curing of greater than 5,000 and is selected from the group consisting of: poly(dienes), poly(methacrylics), poly(acrylamides), poly(methacrylic acids), poly(vinyl ethers), poly(vinyl halides), poly(vinyl esters), poly(styrenes), poly(oxides), poly(carbonates), poly(esters), poly(anydrides), poly(urethanes), poly(siloxanes), poly(sulfones), poly(sulfonamides), poly(amides), poly(imines), poly(benzimidazoles), and carbohydrates, and copolymers of any of the foregoing.

26. A coated sheet material according to claim 21, wherein said coated sheet material is ovenable in a conventional oven at temperatures of about 400° F.

27. A coated sheet material according to claim 26, wherein said coated sheet material is dual-ovenable.

28. A shaped article comprising a coated sheet material that is ovenable in a conventional oven at temperatures of about 400° F. and that is comprised of:
(a) a porous substrate sheet material comprised of cellulose material having at least two oppositely disposed surfaces;
(b) a barrier coating on at least one surface of said substrate sheet material wherein said barrier coating is a blend comprised of: (i) a cross-linkable polymer that is resistant to penetration by water moisture when cured, and (ii) a water-dispersible, film-forming polymer that is resistant to penetration by grease and oil when cured to form a barrier layer on said substrate sheet material; and
(c) a release coating on said barrier layer wherein said release coating comprises a fatty acid complex of a metal ion in an oxidation state equal to or greater than 3, wherein said fatty acid complex of a metal ion is crosslinked to said water-dispersible, film-forming polymer in said barrier layer.

29. A shaped article according to claim 28, wherein said release coating is comprised of a trivalent or tetravalent metal complex of a fatty acid.

30. A shaped article according to claim 29, wherein said cross-linkable polymer is an acrylic polymer.

31. A shaped article according to claim 30, wherein said water-dispersible, film-forming polymer is a polyvinyl alcohol.

32. A shaped article according to claim 29, wherein said cross-linkable polymer is a styrene-butadiene resin.

33. A shaped article according to claim 32, wherein said water-dispersible, film-forming polymer is a polyvinyl alcohol.

34. A method of making a coated sheet material, said method comprising the steps of:
(a) coating one surface of a porous cellulose substrate sheet material having at least two oppositely disposed surfaces, with a barrier coating composition that is a blend solution or dispersion comprised of: (i) a cross-linkable polymer that is resistant to penetration by water moisture when cured, and (ii) a water-dispersible, film-forming polymer that is resistant to penetration by grease and oil when cured, said barrier coating composition forming a barrier layer on said substrate sheet material; and
(b) coating said barrier layer with a release coating composition comprised of a fatty acid complex of a metal ion in an oxidation state equal to or greater than 3, and crosslinking said fatty acid complex of a metal ion to said water-dispersible, film-forming polymer in said barrier layer, said release coating composition forming a release layer on said barrier layer.

35. A method of making a coated sheet material according to claim 34, wherein said coated sheet material is ovenable in a conventional oven at temperatures of about 400° F.

36. A method of making a coated sheet material according to claim 34, wherein said substrate sheet material is comprised of cellulose.

37. A method of making a coated sheet material according to claim 36, wherein said substrate sheet material has a basis weight of between about 20 pounds per 1000 square feet of sheet material and about 40 pounds per 1000 square feet of sheet material.

38. A method of making a coated sheet material according to claim 37, wherein said release coating composition is a solution or dispersion comprised of a trivalent or tetravalent metal complex of a fatty acid.

39. A method of making a coated sheet material according to claim 34, wherein said cross-linkable polymer is an acrylic resin.

40. A method of making a coated sheet material according to claim 34, wherein said cross-linkable polymer is a styrene-butadiene resin.

41. A method of making a coated sheet material according to any of claims 34, 35, 36, 37, 38, 39 or 40, wherein said water-dispersible, film-forming polymer is a polyvinyl alcohol.

42. A method of making a shaped article that is ovenable in a conventional oven at temperatures of about 400° F., said method comprising the steps of:
(a) coating one surface of a porous substrate sheet material comprising cellulose having at least two oppositely disposed surfaces, with a barrier coating composition that is a blend solution or dispersion comprised of: (i) a cross-linkable polymer that is resistant to penetration by water moisture when cured, and (ii) a water-dispersible, film-forming polymer that is resistant to penetration by grease and oil when cured, said barrier coating composition forming a barrier layer on said substrate sheet material;
(b) coating said barrier layer with a release coating composition wherein said release coating comprises a fatty acid complex of a metal ion in an oxidation state equal to or greater than 3, and crosslinking said fatty acid complex of a metal ion to said water-dispersible, film-forming polymer in said barrier layer, said release coating composition forming a release layer on said barrier layer; and
(c) forming said substrate sheet material into a shaped article.

43. A method of making a shaped article according to claim 42, wherein said shaped article is a container for cooking food.

44. A method of making a shaped article according to claim 42, wherein said forming step occurs after both of said coating steps.

45. A method of making a shaped article according to claim 44, wherein said forming step is comprised of the substeps of (i) folding the substrate sheet material into a shape and (ii) maintaining said shape by securing one portion of said sheet material to another portion of said sheet material with an adhesive capable of bonding to said release layer.

46. A method of making a shaped article according to claim 45, wherein said release coating composition is comprised of a trivalent or tetravalent metal complex of a fatty acid.

47. A method of making a shaped article according to claim 46, wherein said cross-linkable polymer is an acrylic polymer.

48. A method of making a shaped article according to claim 46, wherein said cross-linkable polymer is a styrene-butadiene resin.

49. A method of making a shaped article according to any of claims 46, 47 or 48, wherein said water-dispersible, film-forming polymer is a polyvinyl alcohol.

50. A method of protecting a food-contacting surface from penetration by grease, oil and water, wherein said method comprises the steps of:

(a) on the food-contacting surface of a porous substrate sheet material comprising cellulose for use in a food wrapper, receptacle or container, coating said substrate sheet material with a barrier coating composition that is a blend solution or dispersion comprised of: (i) a cross-linkable polymer resistant to penetration by water moisture when cured, and (ii) a water-dispersible, film-forming polymer resistant to penetration by grease and oil when cured, said barrier coating composition forming a barrier layer on said substrate sheet material; and (b) coating said barrier layer with a release coating composition wherein said release coating comprises a fatty acid complex of a metal ion in an oxidation state equal to or greater than 3, and crosslinking said fatty acid complex of a metal ion to said water-dispersible, film-forming polymer in said barrier layer, said release coating composition forming a release layer on said barrier layer.

51. A method according to claim 50, wherein said substrate sheet material is comprised of cellulose.

52. A method according to claim 51, wherein said release coating composition is comprised of a trivalent or tetravalent metal complex of a fatty acid.

\* \* \* \* \*